W. H. HUNGERFORD.
POWER TRANSMITTING APPARATUS.
APPLICATION FILED JUNE 24, 1912.
1,155,314.
Patented Sept. 28, 1915.
2 SHEETS—SHEET 2.
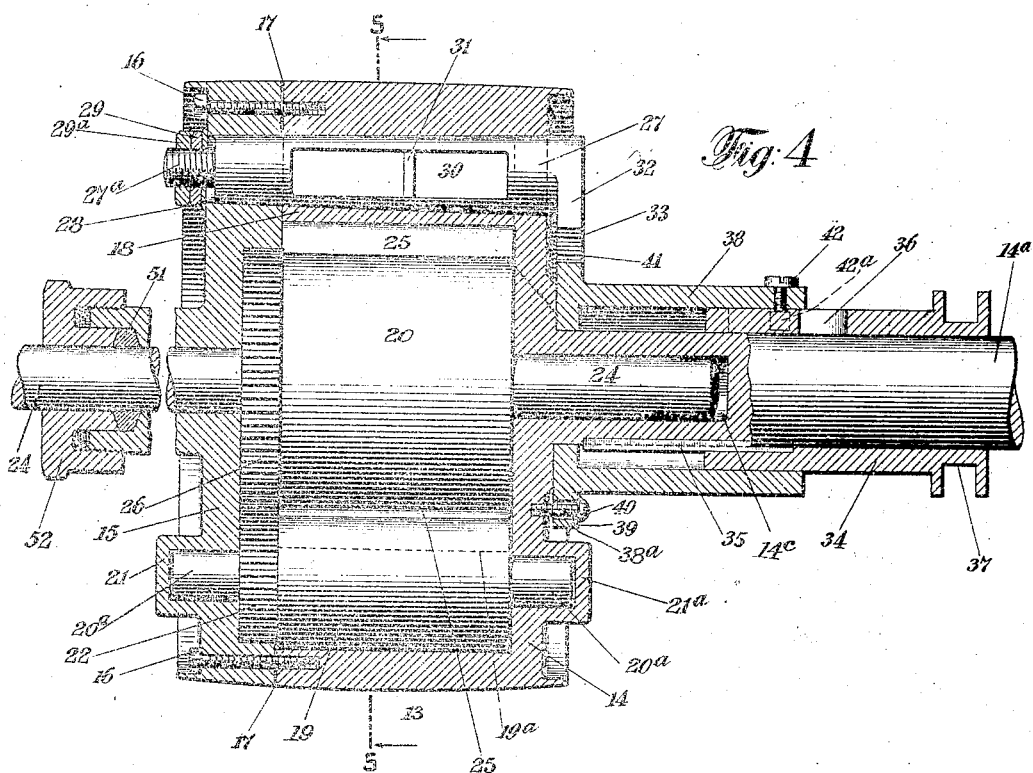
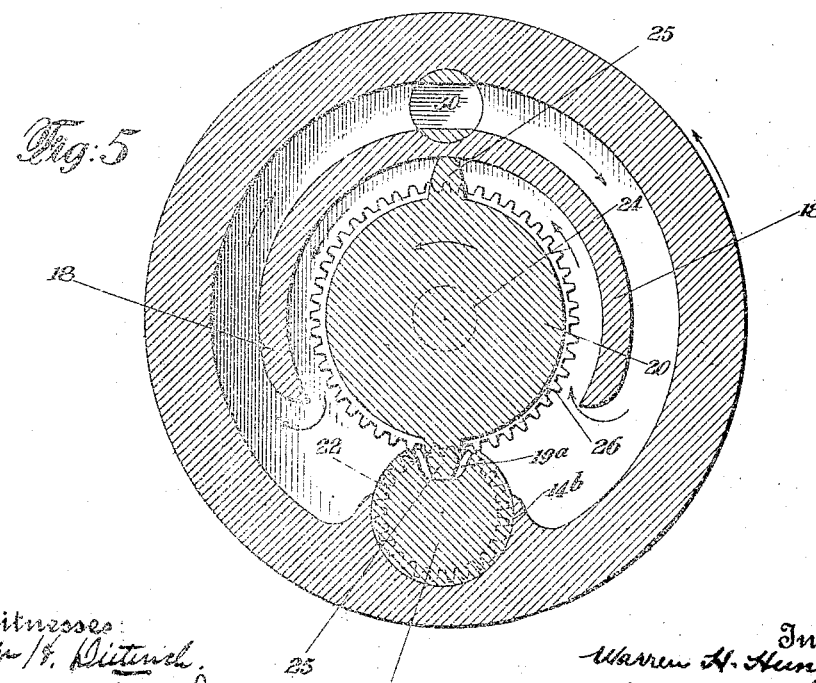
Witnesses
Inventor
Warren H. Hungerford
BY Conrad A. Dieterich
his ATTORNEY

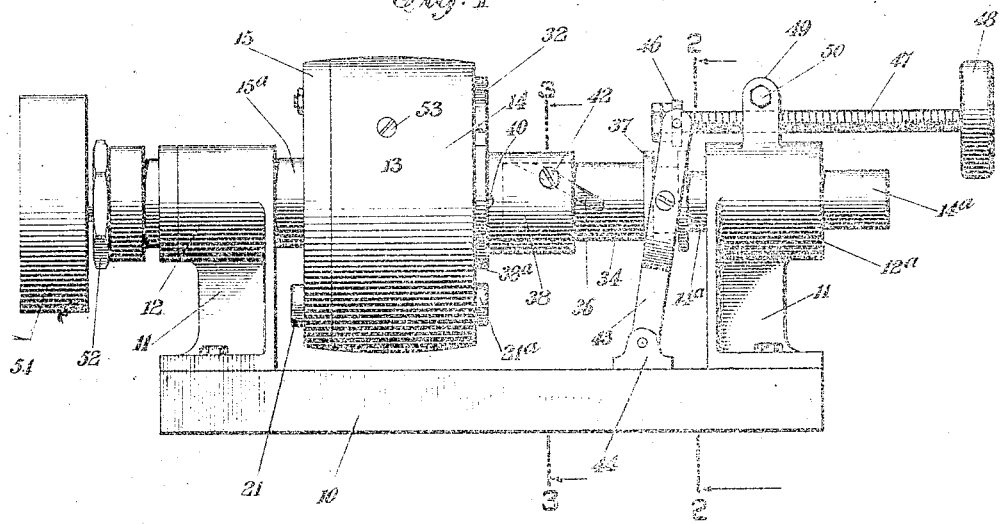
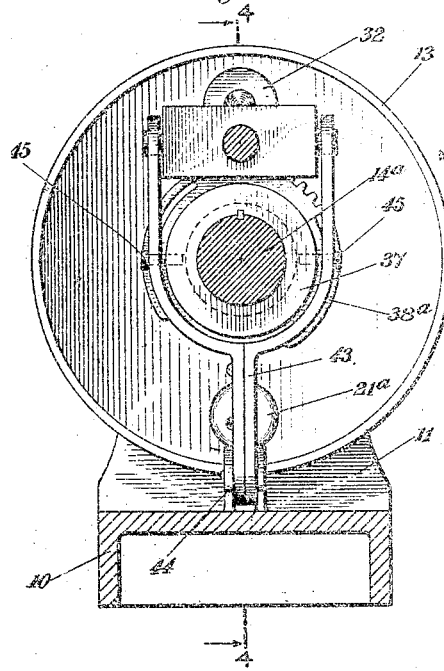
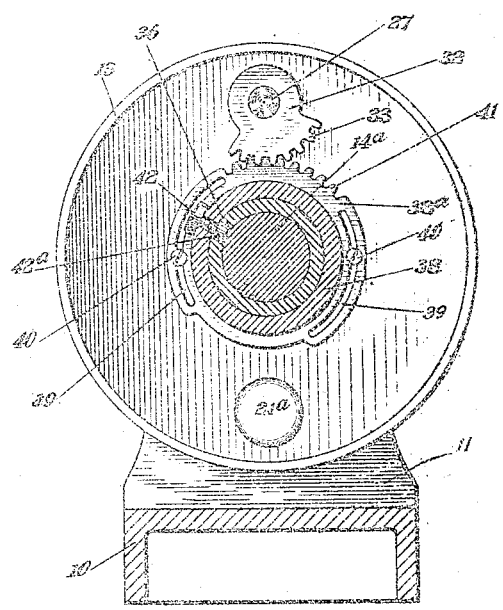

UNITED STATES PATENT OFFICE.

WARREN H. HUNGERFORD, OF CHICAGO, ILLINOIS, ASSIGNOR TO FRANK M. PETERS, OF CHICAGO, ILLINOIS.

POWER-TRANSMITTING APPARATUS.

1,155,314.

Specification of Letters Patent. Patented Sept. 28, 1915.

Application filed June 24, 1912. Serial No. 705,590.

*To all whom it may concern:*

Be it known that I, WARREN H. HUNGERFORD, a citizen of the United States, residing at Chicago, Cook county, in the State of Illinois, have invented a new and useful Improvement in Power-Transmitting Apparatus, of which the following is a full, clear, and exact specification.

My invention relates to improvements in speed changing or power transmitting apparatus, and the same has for its object more particularly to provide a simple, efficient and reliable apparatus by means of which a driving mechanism may communicate or transmit power to a driven mechanism, and be so controlled that any speed from maximum or full speed, (the speed at which the driving mechanism operates) to minimum speed or complete rest may be transmitted to or attained by the driven mechanism.

Further said invention has for its object to provide a speed changing apparatus which may be readily interposed between a driving mechanism and a driven mechanism, and which will permit of the slightest differences or variations in speed being transmitted from said driving mechanism to said driven mechanism.

Further said invention has for its object to provide an apparatus which consists of a fluid casing, which may be readily attached to, or connected with the driving shaft, and which is provided with valve means whereby the circulation of fluid within said casing may be so controlled or retarded that the speed with which said casing rotates relatively to the driving shaft may be definitely and positively regulated and maintained.

Further said invention has for its object to provide a simple, efficient and reliable apparatus in which the operating parts are all inclosed in a suitable casing, containing the operating fluid.

To the attainment of the aforesaid objects and ends, my invention consists in the novel details of construction, and in the combination, connection and arrangement of parts hereinafter more fully disclosed and then pointed out in the claims.

In the accompanying drawings, forming part of this specification, wherein like numerals of reference indicate like parts,—
Figure 1 is a side view showing one form of apparatus constructed according to and embodying my said invention; Fig. 2 is a section of the same, on the line 2—2 of Fig. 1; Fig. 3 is a similar view, on the line 3—3 of Fig. 1; Fig. 4 is an enlarged central longitudinal section taken essentially on the line 4—4 of Fig. 2, and Fig. 5 is an enlarged transverse section taken on the line 5—5 of Fig. 4.

In said drawings, 10 designates a base at the opposite ends of which are secured supports 11, 11, provided at their upper ends with bearings 12, 12$^a$. Intermediate said bearings is mounted a cylindrical casing 13, whose outer surface may act as a gear wheel or as a pulley wheel. The said casing is composed of a casing portion 14, and a cover portion 15, which is secured along its edge by bolts 16, 16, to the open end of said casing portion 14. A thin sheet of packing material 17 is interposed between said cover portion 15 and casing portion 14 in order to form a fluid tight joint.

The casing portion 14 is provided with an integral shaft section 14$^a$, which is supported adjacent to its outer end in the bearing 12$^a$, and the cover portion 15 is provided with a tubular shaft section 15$^a$, arranged in alinement with the shaft section 14$^a$ of the casing 14, and supported adjacent to said cover portion 15 in the bearing 12.

The casing portion 14 is provided upon its inner side with a segmental partition 18 which is arranged concentrically within said casing and forms about two-thirds of the arc of a circle. The said partition extends longitudinally of the casing portion from the rear wall thereof, and has its front edge engaged by the rear side of the cover portion 15.

The inner side of the casing portion 14, between the ends of the segmental partition 18, is provided with a semi-circular recess 14$^b$, in which works a cylindrical member 19, provided at its opposite ends with short shaft sections or trunnions 20$^a$, 20$^a$, which are respectively supported in bearings 21, 21$^a$ provided in the cover portion 15 and casing portion 14. The said cylindrical member is provided with a longitudinal recess 19$^a$, and close to the forward end of said cylindrical member 19 is arranged a small gear 22, which is fixed upon the short shaft section or trunnion 20$^a$.

20 denotes a large cylindrical member which is centrally mounted in the casing portion 14. The said cylindrical member 20 is fixed upon a shaft 24, which has its outer end supported in the tubular shaft section 15ª extending from the cover section 15, and its inner end supported in the recess 14ᶜ provided in the inner end of the shaft section 14ª, extending from the casing portion 14.

The large cylindrical member 20 is provided with two oppositely arranged longitudinal vanes 25, 25, which are co-extensive in length with said cylindrical member 20, and are adapted to mesh with the longitudinal recess 19ª in the smaller cylindrical member 19. Adjacent to the forward end of said cylindrical member 20 is arranged a larger gear 26, which is fixed upon the shaft 24, and meshes with the smaller gear 22. The proportion of the gears 26, and 22 is such that the cylindrical member 19 and its gear 22 will make two complete revolutions to one of the large gear 26 and its cylindrical member 20. The inner surface of the cover portion 15 opposite to the gears 26 and 22, is recessed sufficiently to receive said gears, in order that the cylindrical members 19, 20, will extend the full depth of the casing portion 14.

27 denotes a tapering valve which extends through a suitable opening arranged in the casing and cover portions, and passes through the channel formed between the inner circular wall of the casing portion 14, and the partition 18 therein, about midway of the distance between the ends of said partition, and at a point diametrically opposite to the cylindrical member 19.

The valve 27 is provided at the forward end of the casing with a reduced screw-threaded portion 27ª, upon which are fitted a washer 28, and nuts 29, 29ª. The said valve 27 is also provided with a longitudinal opening 30, and midway between the ends of said opening said valve is provided with a transverse web 31, which is designed to reinforce the sides of said valve, and prevent the fluid pressure injuring or distorting the same. 32 denotes an arm secured to the rear projecting end of said valve 27, and upon the end of said arm is provided a segmental rack 33.

Upon the shaft section 14ª is arranged a sleeve section 34 which is adapted to rotate with said shaft, and which is also adapted to be reciprocated upon said shaft owing to the spline 35 engaging with grooves provided in said shaft section 14 and sleeve section 34. 36 denotes a spiral groove arranged in said sleeve section 34, and 37 denotes a circumferentially grooved collar provided at the outer end of said sleeve 34.

38 denotes a sleeve surrounding the sleeve 34. The said sleeve 38 is provided at its inner end with a flange 38ª having two oppositely-arranged segmental slots 39, 39 therein, through which extend bolts 40, 40, which are so secured in the outer side of the casing 14 as to permit of said sleeve 38 being partially rotated upon the sleeve 34, and to be secured to its adjusted position by the said bolts 40, 40. One portion of the periphery of the flange 38 intermediate the ends of said segmental slots 39, 39 is provided with gear teeth 41, which mesh with the segmental rack 33 on the end of the arm 32, and 42 denotes a screw which extends through the sleeve 38, and into the spiral groove 36 in the sleeve 34, and is provided at its inner end with an anti-friction roller 42ª.

43 denotes an arm having its lower end pivotally secured in a bearing 44 fixed upon the base 10, adjacent to the bearing support 12, and having its upper end bifurcated and provided with studs 45, 45, extending into the circumferential groove 37 of the collar on the sleeve 38. The upper bifurcated ends of said arm 43 are connected by a transverse member 46, which has its ends pivotally secured intermediate the bifurcated ends of said arm 43.

47 denotes an adjusting screw having its inner end revolubly secured in the transverse member 46 of the arm 43, and its other end extending through a split bearing 49 formed as a part of the bearing 12ª and provided with a hand wheel 48. The split bearing 49 is provided with a screw or bolt 50, whereby said bearing 49 may be clamped together in order to secure the screw 47 to its adjusted position.

51 denotes a packing arranged upon the shaft 15, which is maintained in place by a nut 52 screwed upon the threaded end of said hollow shaft section 15ª.

The casing portion 14 is provided with an opening sealed with a screw plug 53, through which the oil or other liquid for operating the apparatus may be introduced into the casing. Upon the outer end of the shaft 24 is fixed a pulley 54 which may be connected by a belt with a suitable source of power. In order to transmit power from the apparatus, a belt may be passed over the casing portion 14 and its cover 15, which jointly form a pulley. It will of course be obvious that instead of taking the power from said casing 14, a pulley or gear may be fixed upon the shaft section 15ª, or a gear may be applied to or formed upon the outer surface of the casing portion 14. Further it will also be obvious that power may be applied to the shaft 24 by means of a pulley or gear located thereon at any desired distance from the casing 13.

The operation of the apparatus is as follows: If we assume that power is being applied to the pulley 54 on the shaft 24, and that said shaft is being rotated in the direction of the arrows Figs. 2, 3 and 5, and assume also that the valve 27 is open, as shown in Figs. 4 and 5, the liquid in the casing 13 will be caused to be circulated therein in the direction of the arrows Fig. 5, by the rotation of the cylindrical members 19 and 20, and the recess and vanes formed thereon. As the valve 27 is open, and the liquid can circulate freely within the casing, the said casing will remain substantially at rest. When it is desired to cause said casing to rotate in order to transmit power to the mechanism to be driven, it merely becomes necessary to shift the upper end of the arm 43 inward toward the casing 14 by actuating the adjusting screw 47. As said arm 43 is moved inward it causes the sleeve 34 to be moved inward also, and in being so moved it will cause the outer sleeve 38 to be partially rotated upon said sleeve 34 by the action of the roller 42$^a$ upon the screw 42 in the sleeve 38 following the curvature of the spiral groove 36 in the sleeve 35. As the sleeve 35 is rotated, the gear teeth 41 thereon being in mesh with the rack 33 on the arm 32 secured to the valve 27, will cause said valve to be closed partly, and thereby retard the circulation of the liquid within the casing 13. The result of this retardation is that the casing 13 will be caused to rotate upon the shaft 24 at a speed less than that of said shaft.

By gradually closing the valve 27 through the medium of the screw 47 and connected parts, the circulation of the liquid within the casing becomes retarded, and in being so retarded the speed of the casing 13 is gradually increased up to the point where the valve 27 is completely closed, and circulation of the liquid in the casing 13 completely interrupted. When this occurs the casing 13 will rotate with substantially the same speed as the shaft 24.

It will of course be understood that by operating the adjusting screw 47, the slightest variations in speed may be obtained, varying from minimum to maximum.

An advantage accruing to this form of apparatus is that the speed with which the same operates may be positively controlled throughout its entire range of speeds, and that no loss of power can result through slipping.

Having thus described my said invention, what I claim and desire to secure by Letters Patent is:

1. An apparatus of the character described, comprising a liquid-containing casing, a plurality of connected compartments therein forming an endless passage, means for controlling the flow of fluid through said endless passage, a rotary piston disposed within said casing, blades on said rotary piston forming spaces between the same which are a multiple of the width of said blades, an abutment, in rolling engagement with said piston, arranged intermediate the communicating ends of said compartments and serving to direct the flow of fluid from one of said compartments directly into the other of said compartments, substantially as specified.

2. An apparatus of the character described, comprising a liquid-containing casing, a plurality of concentric, connected compartments therein forming an endless passage, means for controlling the flow of fluid through said endless passage, a rotary piston located within the inner of said compartments, blades on said rotary piston forming spaces between the same which are a multiple of the width of said blades, and a rotating abutment in rolling engagement with said piston, located intermediate the communicating ends of said compartments, substantially as specified.

3. An apparatus of the character described, comprising a liquid-containing casing, a plurality of concentric, connected compartments therein forming an endless passage, valve means for controlling the flow of fluid through said endless passage, a rotary piston located within the inner of said compartments, blades extending from said piston and forming spaces between the same which are a multiple of the width of said blades, and a rotating, cylindrical abutment provided with means for receiving the blades on said rotary piston arranged intermediate the adjoining, communicating ends of said compartments, substantially as specified.

4. An apparatus of the character described comprising a liquid-containing casing, a plurality of connected compartments therein forming an endless passage, a valve for controlling the flow of fluid through said endless passage, a rotary piston disposed within the inner of said compartments, a pair of blades on said rotary piston, and a rotating abutment provided with means for receiving said blades, and arranged intermediate the adjoining communicating ends of said compartments, and out of the direct path of flow of said fluid and serving to direct the flow of fluid from one of said compartments directly into the other of said compartments, substantially as specified.

5. An apparatus of the character described comprising a liquid-containing casing, a plurality of concentric, connected compartments therein forming an endless passage, a valve for controlling the flow of fluid through said endless passage, a shaft supported within the inner of said compartments, a cylindrical member mounted upon said shaft, a pair of projecting blades on said cylindrical member, and a rotating abutment provided with a longitudinal groove adapted to receive the blades on said cylindrical member; said rotating abutment being located intermediate the adjoining, communicating ends of said compartments, and arranged out of the direct path of flow of said fluid and serving to direct the flow of said fluid from one of said compartments into the other of said compartments, substantially as specified.

6. An apparatus of the character described comprising a liquid-containing casing having a plurality of concentric, connected compartments therein forming an endless passage, a valve for controlling the flow of fluid through said endless passage, a shaft supported within the inner of said compartments, a cylindrical member mounted upon said shaft and revoluble therewith, a pair of oppositely arranged blades on said cylindrical member, a rotating abutment provided with a longitudinal groove adapted to receive the blades on said cylindrical member; said rotating abutment being located intermediate the adjoining communicating ends of said compartments and out of the path of flow of said fluid, and serving to direct the flow of said fluid from one of said compartments into the other of said compartments, and coöperating means fixed partly with said cylindrical member and partly with said abutment for maintaining said cylindrical member and said abutment in operative register, substantially as specified.

7. An apparatus of the character described comprising a liquid-containing casing, a plurality of concentric, connected compartments therein, a valve arranged in said passage for controlling the flow of fluid therethrough, means for actuating said valve, a shaft supported in said casing within the inner of said compartments, a cylindrical member and a gear mounted upon said shaft and revoluble therewith, a pair of oppositely extending blades arranged upon said cylindrical member, a shaft mounted in said casing without said inner compartment and arranged intermediate the adjoining, communicating ends of said compartments, a cylindrical abutment fixed upon said last named shaft and provided with a longitudinal groove adapted successively to receive the blades on said cylindrical member as said cylindrical member rotates; and a gear fixed upon said cylindrical abutment and meshing with the gear on said first-named shaft whereby to maintain said cylindrical member and cylindrical abutment in operative register, substantially as specified.

8. An apparatus of the character described comprising a shaft, a cylindrical liquid-containing casing loosely mounted thereon, a plurality of concentric, connected compartments forming an endless passage therein, a member fixed on said shaft, a pair of blades thereon, a revoluble abutment mounted in said casing intermediate the adjoining communicating ends of said compartments and out of the path of flow of fluid; said revoluble abutment being provided with a groove adapted to receive the blades on the member fixed on said shaft, means for maintaining said first-named member and said revoluble abutment in operative register, a valve arranged in said casing and traversing the passage therein, means for actuating said valve, and means for securing said valve to its adjusted position, substantially as specified.

9. An apparatus of the character described comprising a shaft, a cylindrical liquid-containing casing loosely mounted thereon, a plurality of concentric compartments forming an endless passage therein, a cylindrical member fixed upon said shaft, a pair of blades on said cylindrical member, and a cylindrical abutment coöperating with said cylindrical member arranged intermediate the adjoining, communicating ends of said compartments and provided with a longitudinal groove to receive the blades on said cylindrical member, a valve arranged in said casing and traversing said endless passage therein, whereby to control the passage of fluid through said endless passage, a sector secured to said valve, a segmental gear arranged upon said casing and meshing with said sector, means for actuating said segmental gear to operate said valve, and means for securing said valve to its adjusted position, substantially as specified.

10. An apparatus of the character described comprising a shaft, a cylindrical liquid-containing casing loosely mounted thereon, a plurality of concentric compartments forming an endless passage therein, a cylindrical member fixed upon said shaft, a pair of oppositely arranged blades on said cylindrical member, a gear fixed upon said shaft adjacent to one end of said cylindrical member, a relatively smaller cylindrical abutment arranged intermediate the adjoining communicating ends of said compartments, and in rolling engagement with said cylindrical member, shaft sections at the ends of said cylindrical abutment supported in said casing, said cylindrical abutment having a longitudinal groove therein adapted to receive the blades on said cylindrical member, a gear arranged adjacent to one end of said cylindrical abutment meshing with the gear on said cylindrical member, a valve arranged in said casing and traversing said endless passage therein, means for actuating said valve, and means for securing said valve to its adjusted position, substantially as specified.

11. An apparatus of the character described comprising a shaft, a cylindrical liquid-containing casing, a recessed shaft section extending centrally from one end of said casing and inclosing one end of said shaft, a cover for said casing having a sleeve section extending therefrom and surrounding said first-named shaft, a segmental partition in said casing forming a plurality of concentric, connected passages therein, means for supporting said casing and shaft therein, a cylindrical member fixed upon said last-named shaft and arranged to rotate within said segmental partition, a pair of oppositely arranged longitudinal blades on said cylindrical member, a large gear fixed at one end of said cylindrical member, a smaller cylindrical abutment arranged adjacent to the ends of said segmental partition intermediate the adjacent, communicating ends of said compartments, and in rolling engagement with said cylindrical member, said cylindrical abutment having its opposite ends supported in said casing, a gear fixed at one end of said cylindrical abutment and meshing with the gear on said larger cylindrical member, a valve mounted in said casing and traversing said endless passage therein, means for actuating said valve, and means for securing said valve to its adjusted position, substantially as specified.

Signed at the city of Chicago, Cook county, in the State of Illinois, this 13th day of June, nineteen hundred and twelve.

WARREN H. HUNGERFORD.

Witnesses:
N. HASSETT,
EDMUND P. KELLY.